United States Patent
Mangalvedhe et al.

(10) Patent No.: US 11,540,190 B2
(45) Date of Patent: Dec. 27, 2022

(54) METHODS AND APPARATUSES FOR DEPLOYING A MOVING BASE STATION FOR INTERNET OF THINGS (IOT) APPLICATIONS

(71) Applicant: NOKIA TECHNOLOGIES OY, Espoo (FI)

(72) Inventors: Nitin Mangalvedhe, Hoffman Estates, IL (US); Istvan Kovacs, Aalborg (DK); Benedek Schultz, Budapest (HU); Elena Virtej, Espoo (FI); Jeroen Wigard, Klarup (DK); Mikko Säily, Laukkoski (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 16/145,861

(22) Filed: Sep. 28, 2018

(65) Prior Publication Data
US 2020/0107237 A1    Apr. 2, 2020

(51) Int. Cl.
*H04W 36/14* (2009.01)
*H04W 64/00* (2009.01)
(Continued)

(52) U.S. Cl.
CPC ........ *H04W 36/14* (2013.01); *H04B 7/18504* (2013.01); *H04W 40/246* (2013.01);
(Continued)

(58) Field of Classification Search
CPC ... H04W 36/14; H04W 76/28; H04W 40/246; H04B 7/18504
See application file for complete search history.

(56) References Cited

U.S. PATENT DOCUMENTS

| | | | |
|---|---|---|---|
| 2007/0268863 A1* | 11/2007 | Venkatachalam | H04W 48/18 370/331 |
| 2010/0040024 A1* | 2/2010 | Wu | H04W 8/04 370/331 |

(Continued)

OTHER PUBLICATIONS

Dick Carrillo and Jorge Seki, "Rural Area Deployment of Internet of Things Connectivity: LTE and LoRaWAN Case Study," IEEE XXIV International Conference on Electronics, Electrical Engineering and Computing (INTERCON), Aug. 2017.

(Continued)

*Primary Examiner* — Kevin M Cunningham
(74) *Attorney, Agent, or Firm* — Squire Patton Boggs (US) LLP

(57) ABSTRACT

Systems, methods, apparatuses, and computer program products for deploying an unmanned vehicle base station (BS) are provided. One method may include receiving an indication from at least one device of its capability to switch to a temporary cell of an unmanned vehicle base station (BS), and determining, based on knowledge of locations on a planned path of the unmanned vehicle base station (BS), which of the at least one device is located within coverage of one of the locations on the planned path. The method may then include configuring discontinuous reception cycles or Power-Saving Mode (PSM) of the at least one device so that the at least one device is awake when the unmanned vehicle base station (BS) establishes the temporary cell.

20 Claims, 5 Drawing Sheets

(51) Int. Cl.
  H04B 7/185  (2006.01)
  H04W 76/28  (2018.01)
  H04W 52/02  (2009.01)
  H04W 40/24  (2009.01)

(52) U.S. Cl.
  CPC ... *H04W 52/0229* (2013.01); *H04W 52/0235* (2013.01); *H04W 64/006* (2013.01); *H04W 76/28* (2018.02)

(56) References Cited

U.S. PATENT DOCUMENTS

| | | | | |
|---|---|---|---|---|
| 2010/0142485 | A1* | 6/2010 | Lee | H04W 36/02 |
| | | | | 370/331 |
| 2011/0003591 | A1* | 1/2011 | Venkatachalam | H04L 12/66 |
| | | | | 455/434 |
| 2012/0250599 | A1* | 10/2012 | Henttonen | H04W 52/0216 |
| | | | | 370/311 |
| 2013/0194990 | A1* | 8/2013 | Banister | H04W 24/10 |
| | | | | 370/311 |
| 2015/0181481 | A1* | 6/2015 | Masini | H04W 36/0083 |
| | | | | 455/436 |
| 2016/0028471 | A1 | 1/2016 | Boss et al. | |
| 2017/0019820 | A1* | 1/2017 | Das | H04W 48/20 |
| 2018/0102831 | A1* | 4/2018 | Murphy | H04B 7/18504 |
| 2019/0082373 | A1* | 3/2019 | Patil | H04W 40/244 |
| 2019/0268812 | A1* | 8/2019 | Li | H04W 36/0033 |

OTHER PUBLICATIONS

M. Mozaffari, et al., "Tutorial on UAVs for Wireless Networks: Applications, Challenges, and Open Problems," Mar. 2019, https://arxiv.org/pdf/1803.00680.

W. Shi et al., "3D Drone-cell deployment optimization for drone assisted radio access networks", IEEE CIC, 2017.

O. Esrafilian and D. Gesbert, "Simultaneous User Association and Placement in Multi-UAV Enabled Wireless Networks", Smart Antenna Workshop (WSA), Mar. 2018.

S. Sekander et al., "Multi-Tier Drone Architecture for 5G/B5G Cellular Networks: Challenges, Trends, and Prospects," IEEE Communications Magazine, Mar. 2018, http://ieeexplore.ieee.org/stamp/stamp.jsp?tp=&arnumber=831 6776&isnumber=8316570.

L. M. Schalk and M. Herrmann, "Suitability of LTE for Drone-to-lnfrastructure Communications in Very Low Level Airspace," IEEE, 2017, http://ieeexplore.ieee.org/stamp/stamp.jsp?tp=&arnumber=8102112&isnumber=8101896.

3rd Generation Partnership Project; Technical Specification Group Radio Access Network; Evolved Universal Terrestrial Radio Access (E-UTRA); User Equipment (UE) procedures in idle mode (Release 14), 3GPP TS 36.304, V14.4.0, Sep. 2017.

3rd Generation Partnership Project; Technical Specification Group Core Network and Terminals; Non-Access-Stratum (NAS) protocol for Evolved Packet System (EPS); Stage 3 (Release 15), 3GPP TS 24.301, V15.1.0, Dec. 2017.

3rd Generation Partnership Project; Technical Specification Group Services and System Aspects; Architecture enhancements to facilitate communications with packet data networks and applications (Release 15), 3GPP TS 23.682, V15.3.0, Dec. 2017.

* cited by examiner

METHODS AND APPARATUSES FOR DEPLOYING A MOVING BASE STATION FOR INTERNET OF THINGS (IOT) APPLICATIONS

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to methods for deploying an unmanned aerial vehicle (UAV) base station (BS) for internet of things (IoT) applications.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in E-UTRAN or eNB in LTE) may be named gNB when built on NR radio and may be named NG-eNB when built on E-UTRA radio.

SUMMARY

One embodiment is directed to an apparatus that may include at least one processor and at least one memory comprising computer program code. The at least one memory and computer program code may be configured, with the at least one processor, to cause the apparatus at least to receive an indication from at least one device of its capability to switch to a temporary cell of an unmanned vehicle base station (BS), to determine, based on knowledge of locations on a planned path of the unmanned vehicle base station (BS), which of the at least one device is located within coverage of one of the locations on the planned path, and to configure discontinuous reception cycles or Power-Saving Mode (PSM) of the at least one device so that the at least one device is awake when the unmanned vehicle base station (BS) establishes the temporary cell.

In some embodiments, the at least one memory and the computer program code are further configured, with the at least one processor, to cause the apparatus at least to create a database comprising information on the locations along the path of the unmanned vehicle base station (BS) and corresponding information on which of the at least one device are located within coverage of one of said locations along the planned path of the unmanned vehicle base station (BS).

In certain embodiments, the at least one memory and the computer program code are further configured, with the at least one processor, to cause the apparatus at least to trigger or block through signaling from a terrestrial base station (BS) the at least one device to scan for and select the temporary cell when the unmanned vehicle base station (BS) arrives at said one of the locations.

In certain embodiments, the at least one memory and the computer program code are further configured, with the at least one processor, to cause the apparatus at least to determine the locations for establishing each temporary cell based on at least one of a desired unmanned vehicle base station (BS) service area and a coverage footprint of the temporary cell at each of the locations.

In some embodiments, the at least one memory and the computer program code are further configured, with the at least one processor, to cause the apparatus at least to map the at least one device to said locations based on a coverage footprint of the temporary cell at each of the locations and a geographic location of the at least one device.

In certain embodiments, the at least one memory and the computer program code are further configured, with the at least one processor, to cause the apparatus at least to configure the discontinuous reception cycles or the Power-Saving Mode (PSM) of the at least one device via dedicated radio resource control or system information signaling from a terrestrial base station (BS).

In some embodiments, the at least one memory and the computer program code are further configured, with the at least one processor, to cause the apparatus at least to configure the discontinuous reception cycles of devices within a same coverage area of the temporary cell of the unmanned vehicle base station (BS) to be synchronized or slightly staggered in time.

In certain embodiments, the at least one memory and the computer program code are further configured, with the at least one processor, to cause the apparatus at least to configure the discontinuous reception cycles of devices located in adjacent unmanned vehicle base station (BS) cell coverage areas to be staggered in time.

In some embodiments, the at least one memory and the computer program code are further configured, with the at least one processor, to cause the apparatus at least to configure, before the unmanned vehicle base station (BS) starts on the planned path, the at least one device to switch to a short discontinuous reception cycle.

In certain embodiments, the at least one memory and the computer program code are further configured, with the at least one processor, to cause the apparatus at least to transmit a discovery signal or broadcast signals when the unmanned vehicle base station (BS) sets up the temporary cell, and to support uplink and downlink communication with the at least one device in the temporary cell.

In some embodiments, the apparatus may comprise at least one of the unmanned vehicle base station (BS) or a terrestrial base station.

Another embodiment is directed to a method, which may include receiving an indication from at least one device of its capability to switch to a temporary cell of an unmanned vehicle base station (BS). The method may also include determining, based on knowledge of locations on a planned path of the unmanned vehicle base station (BS), which of the at least one device is located within coverage of one of the locations on the planned path, and configuring discontinuous reception cycles or Power-Saving Mode (PSM) of the at least one device so that the at least one device is awake when the unmanned vehicle base station (BS) establishes the temporary cell.

Another embodiment is directed to an apparatus, which may include receiving means for receiving an indication from at least one device of its capability to switch to a temporary cell of an unmanned vehicle base station (BS). The apparatus may also include determining means for determining, based on knowledge of locations on a planned path of the unmanned vehicle base station (BS), which of the at least one device is located within coverage of one of the locations on the planned path, and configuring means for configuring discontinuous reception cycles or Power-Saving Mode (PSM) of the at least one device so that the at least one device is awake when the unmanned vehicle base station (BS) establishes the temporary cell.

Another embodiment is directed to an apparatus, which may include circuitry configured to receive an indication from at least one device of its capability to switch to a temporary cell of an unmanned vehicle base station (BS). The apparatus may also include circuitry configured to determine, based on knowledge of locations on a planned path of the unmanned vehicle base station (BS), which of the at least one device is located within coverage of one of the locations on the planned path, and circuitry configured to configure discontinuous reception cycles or Power-Saving Mode (PSM) of the at least one device so that the at least one device is awake when the unmanned vehicle base station (BS) establishes the temporary cell.

Another embodiment is directed to an apparatus that may include at least one processor and at least one memory comprising computer program code. The at least one memory and computer program code may be configured, with the at least one processor, to cause the apparatus at least to signal, to a network, an indication that the apparatus is capable of switching to a temporary cell of an unmanned vehicle base station (BS), to receive a configuration of discontinuous reception cycles or Power-Saving Mode (PSM) so that the apparatus is awake when the unmanned vehicle base station (BS) establishes the temporary cell, to receive a trigger to scan for and reselect the temporary cell of the unmanned vehicle base station (BS) when the unmanned vehicle base station (BS) arrives at the location of the apparatus, and to initiate cell reselection and select the temporary cell.

Another embodiment is directed to a method that may include signaling, by a UE to a network, an indication that the UE is capable of switching to a temporary cell of an unmanned vehicle base station (BS), receiving a configuration of discontinuous reception cycles or Power-Saving Mode (PSM) so that the UE is awake when the unmanned vehicle base station (BS) establishes the temporary cell, receiving a trigger to scan for and reselect the temporary cell of the unmanned vehicle base station (BS) when the unmanned vehicle base station (BS) arrives at the location of the apparatus, and initiating cell reselection and selecting the temporary cell.

Another embodiment is directed to an apparatus that may include signaling means for signaling, to a network, an indication that the apparatus is capable of switching to a temporary cell of an unmanned vehicle base station (BS), receiving means for receiving a configuration of discontinuous reception cycles or Power-Saving Mode (PSM) so that the apparatus is awake when the unmanned vehicle base station (BS) establishes the temporary cell, receiving means for receiving a trigger to scan for and reselect the temporary cell of the unmanned vehicle base station (BS) when the unmanned vehicle base station (BS) arrives at the location of the apparatus, and initiating means for initiating cell reselection and selecting the temporary cell.

Another embodiment is directed to an apparatus, which may include circuitry configured to signal, to a network, an indication that the apparatus is capable of switching to a temporary cell of an unmanned vehicle base station (BS), circuitry configured to receive a configuration of discontinuous reception cycles or Power-Saving Mode (PSM) so that the apparatus is awake when the unmanned vehicle base station (BS) establishes the temporary cell, circuitry configured to receive a trigger to scan for and reselect the temporary cell of the unmanned vehicle base station (BS) when the unmanned vehicle base station (BS) arrives at the location of the apparatus, and circuitry configured to initiate cell reselection and select the temporary cell.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for deploying a moving base station (BS) for internet of things (IoT) applications, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Narrowband internet of things (NB-IoT) technology, which was introduced by 3GPP in Release-13, provides wide-area wireless connectivity for the IoT. Some key features of the technology include low power consumption for devices enabling increased battery life and coverage enhancement for devices experiencing a large path loss with the serving cell.

NB-IoT may be deployed in a variety of scenarios. For example, one application of NB-IoT may be for services in rural or remote areas, such as where agricultural sensors can be spread over very wide areas.

It should be noted that, while example embodiments discussed in the following may refer to a UAV-BS, certain embodiments are also applicable to any unmanned vehicle or moving base station, with or without elevation, such as an UAV, automatically guided vehicle (AGV), or the like. Therefore, where reference is made to a UAV-BS, it should be understood to also include any other type of unmanned vehicle base station or moving base station, such as an AGV-BS or the like.

Figure 1:
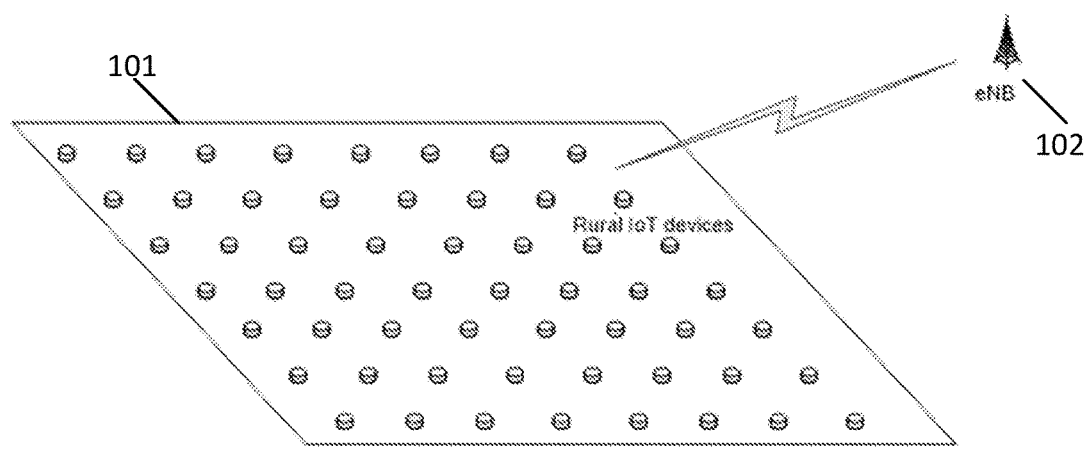
FIG. 1 illustrates an example of devices or sensors remotely connected to base station(s), according to one example.

FIG. 1 illustrates an example of devices or sensors 101 remotely connected to a base station(s) 102. As illustrated in the example of FIG. 1, in a rural application of IoT, devices/sensors 101 may be located very remotely relative to the base station 102, and may have poor connectivity as a result. The network deployment is likely to be sparse and, while it may provide coverage to all devices 101, the remote devices 101 may be supported through coverage enhancement and therefore may achieve very low data rates. As a result, the resource utilization for supporting these devices is high from the network perspective. On the device side, uplink (UL) and downlink (DL) data transfer consumes higher power, thereby reducing the battery life.

Certain example embodiments are configured to use one or more moving BSs or unmanned aerial vehicle (UAV)-BSs for communication with IoT devices on a periodic basis (e.g., once a day for collecting sensor reports or once a month for software updates) at multiple predetermined locations along a route. In some examples, the UAV-BSs may have established radio links with a network, e.g., with terrestrial eNB(s)/gNB(s).

It is noted that a (IoT) device does not necessarily know the exact timing of the UAV-BS being present for the device, but the network may be aware of the flight plan of the UAV-BS and the timings. In an embodiment, the network may also know where devices are located, and can therefore determine when the UAV-BS is in the vicinity of a device.

According to some embodiments, the UAV-BSs may maintain a wireless backhaul connection to a ground station and move along pre-established flight paths, which are known by the network, setting up temporary cells over the devices deployed in the area. The radio links between the UAV-BSs and the terrestrial eNB(s)/gNB(s) have significantly higher performance compared to the links with the IoT devices, due to expected line-of-sight propagation conditions.

In an embodiment, when the UAV cell is available, the devices may connect to the UAV cell and, when the UAV cell is not present, the devices may move to an energy saving mode by switching off, for instance, cell search, using aggressive discontinuous reception (DRX) settings or move to power saving mode. In order to accommodate this, the UAV may have the following two sets of parameters stored: (1) parameters for data exchange with the UAV-BS, optimizing cell selection to the UAV-BS and data exchange to it, and (2) energy saving settings, turning off cell search, aggressive DRX, etc.

Figure 2:
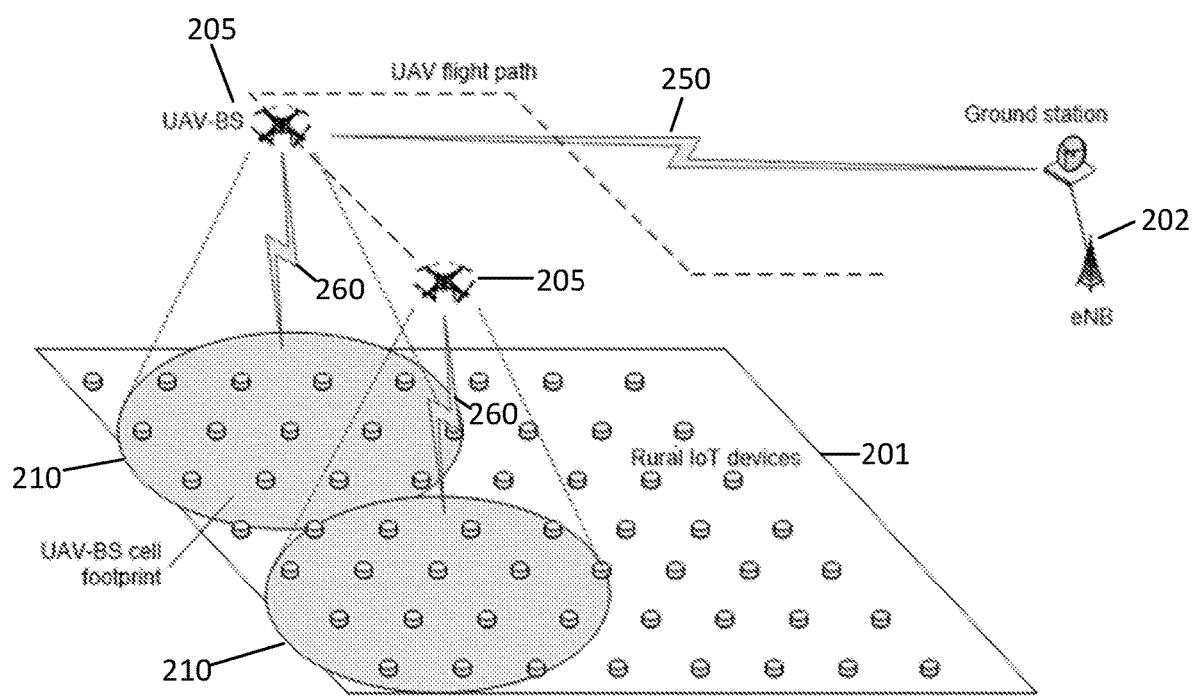
FIG. 2 illustrates an example system depicting unmanned vehicle base station(s) setting up temporary cells for supporting IoT services or devices, according to an embodiment.

FIG. 2 illustrates an example system depicting UAV-BSs 205 setting up temporary cells 210 for supporting IoT services or devices 201. It should be noted that, while FIG. 2 illustrates an aerial vehicle BS, the example of FIG. 2 could also apply to any type of unmanned vehicle or moving base station, such as an AGV-BS or the like.

In the example of FIG. 2, as a UAV-BS 205 may move fast, the switching between the two states also needs to be performed rather fast. This can be done through broadcasting which set of parameters are to be used by the devices 201 through the ground base station 202, as devices will be connected to the ground base station 202 between the UAV-BS 205 fly over occasions. To optimise the use of the different settings, one embodiment introduces the possibilities of having the devices 201 split into groups. In one embodiment, a single bit per group in the broadcast channel can be used to switch from one state to the other. Since the broadcast information needs to be received/obtained by the devices 201, the base station 202 may need to take into account the sleep cycles of the devices 201 when deciding on the timing of the broadcast messages, such that the devices 201 use the correct settings when the UAV-BS 205 arrives in their vicinity. The IoT devices have very good connectivity via link 260 with the temporary cell 210 established by the UAV-BS 205 and can complete UL/DL data transfer quickly, thereby consuming less power compared to using the direct link 250 to the terrestrial eNB/gNB 202.

According to example embodiments, IoT devices with a special UE capability are able to quickly switch to a temporary UAV-BS cell and the devices signal this capability to the network. In an embodiment, the network may create a database of multiple UAV-BS locations within a remote area (relative to a terrestrial eNB) along a planned route and the corresponding UAV-service-capable devices served by the cell at each of those locations.

According to one embodiment, the extended DRX (eDRX) cycles or Power-Saving Mode (PSM) of UAV-service-capable devices may be configurable via dedicated radio resource control (RRC) or system information signaling from the terrestrial eNB/gNB and/or the UAV-BS such that devices in each temporary cell of the UAV-BS are awake when the UAV-BS establishes a temporary cell. In some embodiments, the terrestrial eNB/gNB can a priori re-configure, trigger and/or block devices with the UAV-service capability to scan, select and/or reselect the UAV-BS cells when the UAV-BSs arrive at the different geographical locations.

As mentioned above, according to example embodiments, certain IoT devices may have a special UE capability to quickly switch to a temporary UAV cell and these devices may signal this capability to the network. For example, in an embodiment, devices (e.g., UEs) in idle-mode DRX or eDRX, or those configured with the PSM, may normally be synchronized to the terrestrial eNB/gNB. Additionally, in one example, devices may be in coverage enhancement and have network connectivity to the terrestrial eNB/gNB. Then, in an embodiment, only the devices with the special UE capability may be triggered to initiate cell reselection to the UAV-cell even when the normal signal-quality metrics for the terrestrial cell are satisfied. However, devices without this capability can attempt to reselect the UAV-BS cell with currently specified cell-reselection mechanisms at the cost of high batter consumption (short DRX).

According to certain embodiments, the network may create a database of multiple UAV-BS locations within a remote area (relative to a terrestrial eNB/gNB network) along a planned route and the corresponding UAV-service-capable IoT devices served by the cell at each of those locations. In some embodiments, locations for establishing each UAV-cell may be determined based on desired UAV-BS service area and the coverage footprint of the UAV-cell at each location. In an embodiment, the mapping of UAV-service-capable devices to UAV-BS locations may be based on the coverage footprint for each UAV-BS location and the geographic location of devices. Alternatively, in an embodiment, the mapping may also be based on, or assisted by, measurement reports corresponding to each UAV-BS location. When new devices are deployed in the field and signal their UAV-service capability to the network, the network may register them and the above methods can be used to map them to UAV-BS locations.

In some embodiments, the network may determine the flight path for the UAV based on the coverage footprint of the terrestrial eNB, the ground coverage area of a single UAV-cell, and the knowledge of locations of the IoT devices. According to certain embodiments, the network may determine the individual UAV-BS locations for temporary cells along this flight path considering the ground coverage area of each cell.

Figure 3:
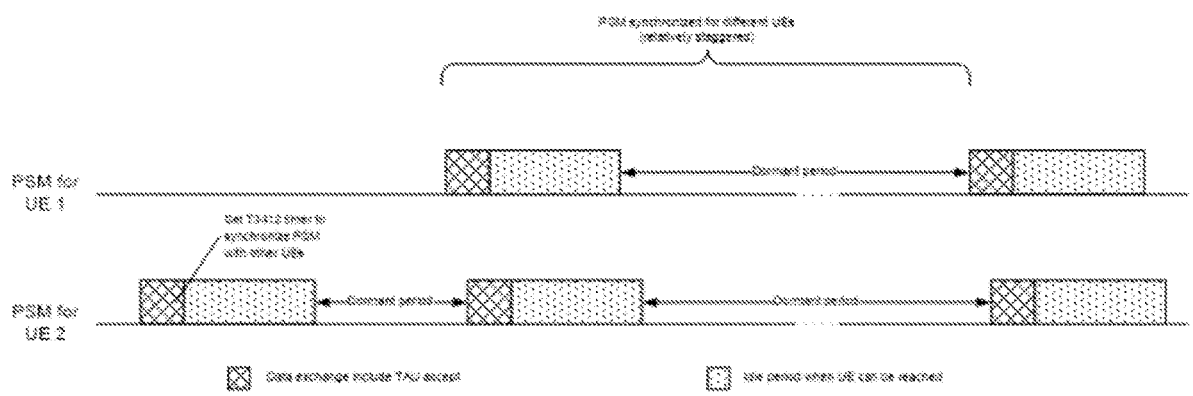
FIG. 3 illustrates an example of the synchronizing of PSM among different devices by adjusting timers, according to certain embodiments.

In some embodiments, the eDRX cycles or PSM of the UAV-service-capable devices may be configurable via dedicated RRC or system information signaling from the terrestrial eNB and/or the UAV-BS, such that devices in each temporary cell of the UAV-BS are awake when the UAV-BS establishes a temporary cell. When UAV-service capable devices request a PSM configuration through a tracking area update (TAU) request message, the network can configure, through the TAU accept message, the T3412 timer (Extended Value Timer) of all devices within a UAV-cell area to expire in a synchronized manner. The T3412 timer may determine the TAU period and hence how long the UE remains dormant before becoming active again for the next TAU. The network can subsequently configure the T3324 timer (Active Timer) and the T3412 timer of the devices such that the devices become active at the next expected UAV-BS arrival time and stay active long enough for the completion of all UL and DL messaging. FIG. 3 illustrates an example of the synchronizing of PSM among different devices (UE1 and UE2) by adjusting timers, according to certain embodiments.

According to some embodiments, for frequent (or short periodicity) connection to UAV-BS, the eDRX cycles or PSM of the IoT devices may be reconfigured by the UAV-BS using broadcast/multicast or dedicated RRC signaling. In an embodiment, the same timers T3412 and T3324 may be adjusted as in the case of reconfiguration received from the terrestrial eNB/gNB. The IoT device should be able to receive the configuration commands for these timers without the need to send TAU request and receive TAU accept messages to the UAV-BS. Instead, according to an embodiment, broadcast/multicast or dedicated RRC signaling from the UAV-BS may be used.

In certain embodiments, the eDRX cycles of all devices within a UAV-BS-cell coverage area may be configured to be synchronized (e.g., same eDRX-Config-CycleStartOffset, etc.) or slightly staggered. According to one example, the network may configure one or more of the devices for long eDRX cycles (e.g., tens of minutes) to save power.

Figure 4:
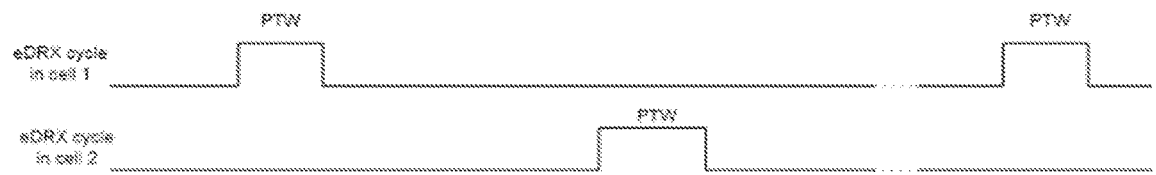
FIG. 4 illustrates an example of the coordination of eDRX cycles in different cells, according to one embodiment.

According to some embodiments, the eDRX cycles of devices in adjacent UAV-BS-cell coverage areas along a planned flight path of the UAV-BS may be staggered. FIG. 4 illustrates an example of the coordination of eDRX cycles in different cells (cell 1 and cell 2), according to one embodiment. In an embodiment, the time offset allows a UAV-BS to complete its planned service at one location and then move on to the next location.

According to certain embodiments, some time before the UAV-BS starts on its temporary-cell flight path, the terrestrial eNB/gNB may configure (e.g., through a short system information message) all UAV-service capable UEs to switch to short DRX cycles. This is because devices are easier to reach when they have short DRX cycles. In an embodiment, the devices may be reconfigured with their previous eDRX cycles (i.e., their eDRX cycle prior to switching to short DRX) after completion of the data connection with the temporary cell. In some embodiments, when it is desirable to use a very long DRX cycle (e.g., up to tens of minutes), the wake up would need to be anticipated to avoid the UAV-BS waiting for the next wake up cycle. For example, the UAV-BS could signal (via connection to another BS) when it is approaching the area so that the ground BS could reconfigure the DRX cycles of the devices to occur shortly after the expected arrival—or alternatively go to a shorter DRX cycle temporarily.

In some embodiments, a remote BS (e.g., the terrestrial eNB/gNB) may trigger devices with the UAV-service capability to scan for and reselect the UAV-cell when the UAV-BS arrives at the different cell locations. For example, some time before the UAV-BS starts on its temporary-cell flight path, the remote BS may trigger devices (through a short message in system information) to scan for the temporary cell. In an embodiment, cell reselection may be initiated by forcing one of the required conditions—e.g., by broadcasting a new threshold $S_{IntraSearchP}$ applicable only to UAV-service-capable devices such that the criterion Srxlev>$S_{IntraSearchP}$ would not be fulfilled and the devices would be forced to initiate cell reselection. In one example, the UAV-BS may transmit a discovery signal or normal synchronization and broadcast signals when it sets up a temporary cell. Devices may then perform cell reselection and select the temporary UAV-cell.

According to example embodiments, the UAV-BS may move or fly along a predetermined path, establish temporary cells at the locations in the previously created database, and support UL/DL communications with the devices in each cell. In an embodiment, the UAV-BS may maintain a backhaul connection with the ground station over a dedicated link. The UAV-BS may move or fly into the first predetermined location and establish a temporary cell (e.g., starts transmitting synchronization signals or SSB). For reporting, the UAV-BS may issue a network command to each device and the device may respond with the corresponding report. In an embodiment, Mobile Autonomous Reporting (MAR) may also be configured this way where devices are preconfigured to report at the time the UAV-BS forms a cell. For software updates, the UAV-BS may send out a network command to initiate the update followed by a multi-cast transmission in the entire cell (e.g., single-cell point-to-multipoint (SC-PTM)). At the completion of all communications in the first predetermined location, the UAV-BS may move onto the next predetermined location and repeat the above procedure for the devices in the new cell. In some embodiments, the report or software update time may be optimized by performing them at a time of the day when the offloading of the devices to the temporary cell is most beneficial to the remote BS. The UAV-BS may follow the full predetermined path, perform the above procedures at each predetermined location, and return after completion of all communications.

Figure 5A:
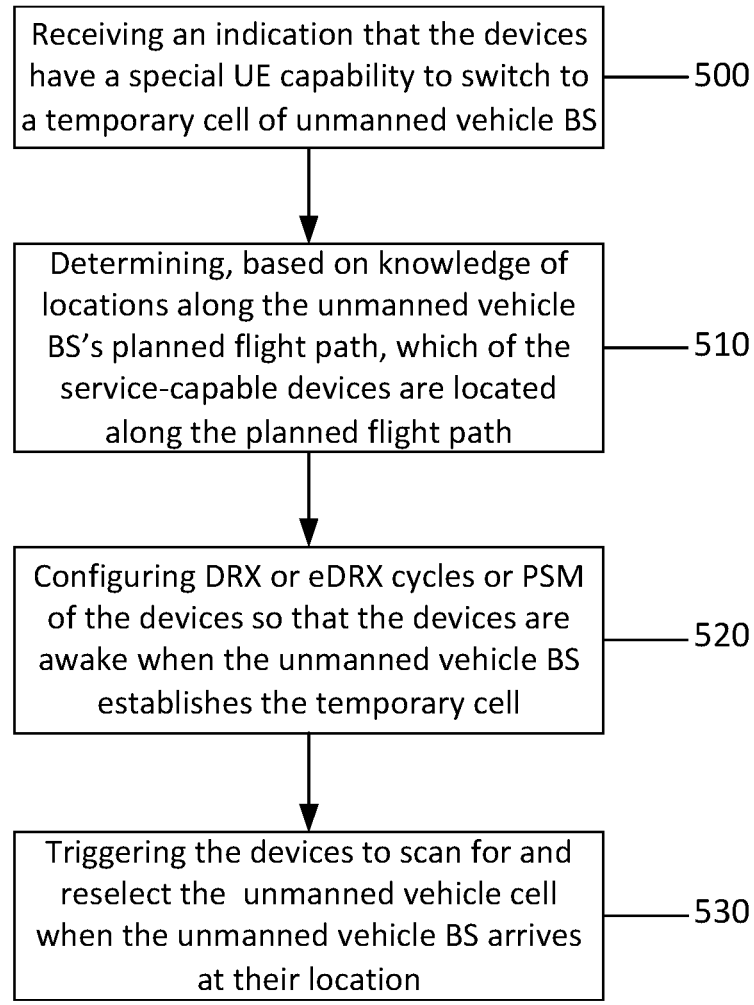
FIG. 5a illustrates an example flow diagram of a method, according to one embodiment.

FIG. 5a illustrates an example flow diagram of a method for deploying one or more unmanned vehicle base stations, such as UAV-BS(s) or AGV-BSs, according to an example embodiment. In certain example embodiments, the flow diagram of FIG. 5a may be performed by a network entity or network node in a 3GPP communication system, such as LTE or 5G NR. For instance, in some example embodiments, the method of FIG. 5a may be performed by a base station, eNB, gNB, moving base station, unmanned vehicle base station, UAV-BS, AGV-BS, or the like in a 5G or NR system. It should be noted that, while certain embodiments discussed below make reference to a UAV-BS, it should be understood that a UAV-BS may include any type of unmanned vehicle BS, moving BS, AGV-BS, or the like.

In one embodiment, the method of FIG. 5a may include, at 500, receiving, from one or more devices, an indication that the devices have a special UE capability to quickly switch to a temporary cell of a UAV-BS. In one example, the devices may include IoT devices, UEs, or sensors, and these devices may be referred to herein as UAV-service-capable devices. In some examples, in an embodiment, the devices may be in idle-mode DRX or eDRX, or configured with the PSM, and may normally be synchronized to a terrestrial eNB/gNB. Additionally, in one example, the devices may be in coverage enhancement and have network connectivity to the terrestrial eNB/gNB. In one embodiment, the UAV-BS may be configured to move or fly along a predetermined or planned path and establish temporary cells at certain locations along the path.

According to an embodiment, the method of FIG. 5a may also include, at 510, determining, based on knowledge of locations along the UAV-BS's planned flight path, which of the UAV-service-capable devices are located along the planned flight path. According to certain embodiments, the determining 510 may include creating a database of multiple UAV-BS locations within a remote area (relative to the terrestrial eNB/gNB) along the planned path and the corresponding UAV-service-capable devices served by the cell at each of those locations. In some embodiments, locations for establishing each UAV-cell may be determined based on a desired UAV-BS service area and the coverage footprint of the UAV-cell at each location. In an embodiment, the creating of the database may include mapping of UAV-service-capable devices to UAV-BS locations based on the coverage footprint for each UAV-BS location and the geographic location of devices. Alternatively, in an embodiment, the mapping may also be based on, or assisted by, measurement reports corresponding to each UAV-BS location. When new devices are deployed in the field and signal their UAV-service capability to the network, the method may include registering the new devices and using the above methods to map them to UAV-BS locations. In some embodiments, the planned flight path and the UAV-BS locations may be determined based on the coverage footprint of the terrestrial eNB/gNB, the ground coverage area of the UAV-BS, and/or the locations of the UAV-service-capable devices in the remote area.

In certain embodiments, the method of FIG. 5a may also include, at 520, configuring DRX or eDRX cycles or PSM of the devices so that the devices are awake when the UAV-BS establishes the temporary cell. In some embodiments, the configuring 520 may include configuring the eDRX cycles or PSM of the UAV-service-capable devices via dedicated RRC or system information signaling from the terrestrial eNB/gNB and/or the UAV-BS, such that devices in each temporary cell of the UAV-BS are awake when the UAV-BS establishes a temporary cell.

According to certain embodiments, the configuring 520 may include configuring, some time before the UAV-BS starts on its temporary-cell flight path, all UAV-service capable devices to switch to short DRX cycles. In an embodiment, the method may include, after completion of the data connection with the temporary cell, reconfiguring the devices with their previous eDRX cycles (i.e., their eDRX cycle prior to switching to short DRX). In some embodiments, when it is desirable to use really long DRX cycle (e.g., up to tens of minutes), the wake up would need to be anticipated to avoid the UAV-BS waiting for the next wake up cycle. For example, in this case, the method may include signaling (e.g., via connection to another BS) when the UAV-BS is approaching the area so that a ground BS can reconfigure the DRX cycles of the devices to occur shortly after the expected arrival of the UAV-BS—or alternatively go to a shorter DRX cycle temporarily.

When UAV-service capable devices request a PSM configuration through a TAU request message, the configuring 520 may include configuring, through the TAU accept message, the T3412 timer (Extended Value Timer) of all devices within a UAV-cell area to expire in a synchronized manner. The T3412 timer may determine the TAU period and hence how long the UE remains dormant before becoming active again for the next TAU. The configuring 520 may include subsequently configuring the T3324 timer (Active Timer) and the T3412 timer of the devices such that the devices become active at the next expected UAV-BS arrival time and stay active long enough for the completion of all UL and DL messaging.

According to some embodiments, for frequent (or short periodicity) connection to UAV-BS, the eDRX cycles or PSM of the IoT devices may be reconfigured by the UAV-BS using broadcast/multicast or dedicated RRC signaling. In an embodiment, the same timers T3412 and T3324 may be adjusted as in the case of reconfiguration received from the terrestrial eNB/gNB. The IoT device should be able to receive the configuration commands for these timers without the need to send TAU request and receive TAU accept messages to the UAV-BS. Instead, according to an embodiment, broadcast/multicast or dedicated RRC signaling from the UAV-BS may be used.

In certain embodiments, the configuring 520 may include configuring the eDRX cycles of all devices within a UAV-BS-cell coverage area to be synchronized (e.g., same eDRX-Config-CycleStartOffset, etc.) or slightly staggered. According to one example, the configuring 520 may include configuring one or more of the devices for long eDRX cycles (e.g., tens of minutes) to save power. According to some embodiments, the configuring 520 may include configuring the eDRX cycles of devices in adjacent UAV-BS-cell coverage areas along a planned flight path of the UAV-BS to be staggered.

According to example embodiments, the UAV-BS may move or fly along its predetermined path, and the method may include establishing temporary cells at the locations in the previously created database, and supporting UL/DL communications with the devices in each cell. In an embodiment, the UAV-BS may maintain a backhaul connection with a ground station over a dedicated link.

In some embodiments, the method of FIG. 5a may further include, at 530, triggering the UAV-service-capable devices to scan for and reselect the UAV-cell when the UAV-BS arrives at the different cell locations. For example, some time before the UAV-BS starts on it temporary-cell flight path, triggering 530 may include triggering the devices (through a short message in system information) to scan for the temporary cell established by the UAV-BS. In an embodiment, the triggering 530 may include initiating cell reselection by forcing one of the required conditions—e.g., by broadcasting a new threshold $S_{IntraSearchP}$ applicable only to UAV-service-capable devices such that the criterion Srxlev>$S_{IntraSearchP}$ would not be fulfilled and the devices would be forced to initiate cell reselection. In one example, the triggering 530 may include transmitting a discovery signal or normal synchronization and broadcast signals when the UAV-BS sets up the temporary cell. The devices may then perform cell reselection and select the temporary UAV-cell. In an embodiment, the triggering 530 may include triggering the devices to initiate cell reselection to the temporary cell set up by the UAV-BS, even when the normal signal-quality metrics for the terrestrial cell are satisfied.

According to an embodiment, for reporting, the method may include issuing a network command to each device and receiving a response from the devices with the corresponding report. In another embodiment, the method may include preconfiguring the devices to perform Mobile Autonomous Reporting (MAR) at the time the UAV-BS forms its temporary cell. For software updates, the method may include transmitting a network command to initiate the update followed by a multi-cast transmission in the entire cell (e.g., SC-PTM). In some embodiments, the report or software update time may be optimized by performing them at a time of the day when the offloading of the devices to the temporary cell is most beneficial to the remote BS. In certain embodiments, the method may include repeating the configuring 520 and triggering 530 at each predetermined location on the planned path of the UAV-BS.

Figure 5B:
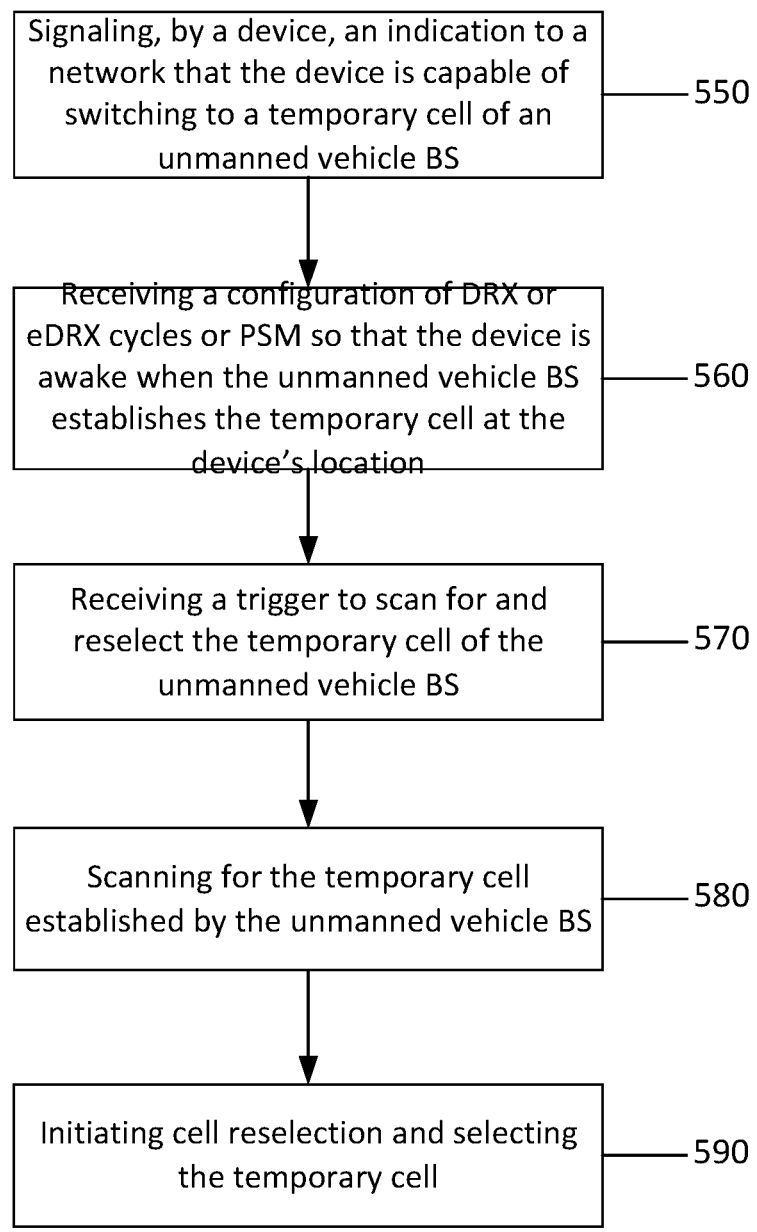
FIG. 5b illustrates an example flow diagram of a method, according to one embodiment.

FIG. 5b illustrates an example flow diagram of a method for deploying one or more UAV-BS(s), according to an example embodiment. In certain example embodiments, the flow diagram of FIG. 5b may be performed by a mobile station, device, user terminal, sensor or UE, associated with a communications system or network, such as a 5G or NR system. For example, in some embodiments, the method of FIG. 5b may be performed by an IoT device, IoT UE or IoT sensor.

In an embodiment, the method of FIG. 5b may include, at 550, a device signaling, to the network, an indication that the device is a UAV-service-capable device that is capable of quickly switching to a temporary cell of a UAV-BS that is configured to move or fly along a predetermined or planned path and establish temporary cells at certain locations along the path.

In certain embodiments, the method of FIG. 5b may also include, at 560, receiving a configuration of DRX or eDRX cycles or PSM so that the device is awake when the UAV-BS establishes the temporary cell at the device's location. In some embodiments, the receiving of the configuration 560 may include receiving the configuration of the eDRX cycles or PSM via dedicated RRC or system information signaling from a terrestrial eNB/gNB and/or the UAV-BS.

According to certain embodiments, the receiving of the configuration 560 may include receiving a configuration, at some time before the UAV-BS starts on its temporary-cell flight path, to switch to short DRX cycles. In an embodiment, the method may include, after completion of the data connection with the temporary cell, receiving a reconfiguration to return to a previous eDRX cycles (i.e., the eDRX cycle prior to switching to short DRX).

When the device requests a PSM configuration through a TAU request message, the receiving of the configuration 560 may include receiving a configuration, through the TAU accept message, for the T3412 timer (Extended Value Timer) to expire in a synchronized manner with other devices in the temporary cell of the UAV-BS. The T3412 timer may determine the TAU period and hence how long the device remains dormant before becoming active again for the next TAU. The receiving of the configuration 560 may include subsequently receiving a configuration of the T3324 timer (Active Timer) and the T3412 timer such that the device becomes active at the next expected UAV-BS arrival time and stays active long enough for the completion of all UL and DL messaging.

According to some embodiments, for frequent (or short periodicity) connection to UAV-BS, the eDRX cycles or PSM of the device may be reconfigured by the UAV-BS using broadcast/multicast or dedicated RRC signaling. In an embodiment, the same timers T3412 and T3324 may be adjusted as in the case of reconfiguration received from the terrestrial eNB/gNB. The receiving of the configuration 560 may include receiving the configuration commands for these timers without the need for sending TAU request and receive TAU accept messages to the UAV-BS. Rather, according to an embodiment, broadcast/multicast or dedicated RRC signaling from the UAV-BS may be used.

In certain embodiments, the receiving of the configuration 560 may include receiving a configuration such that the eDRX cycle of the device is synchronized with other devices within a UAV-BS-cell coverage or is slightly staggered. According to one example, the receiving of the configuration 560 may include receiving a configuration for long eDRX cycles (e.g., tens of minutes) to save power. According to some embodiments, the receiving of the configuration 560 may include receiving a configuration such that the eDRX cycle of the device is staggered with respect to the devices in adjacent UAV-BS-cell coverage areas along the planned flight path of the UAV-BS.

In some embodiments, the method of FIG. 5b may further include, at 570, receiving a trigger to scan for and reselect the temporary cell of the UAV-BS when (or slightly before) the UAV-BS arrives at its location. In one example, the receiving of the trigger 570 may include receiving a discovery signal or normal synchronization and broadcast signals when the UAV-BS sets up the temporary cell. In an embodiment, some time before the UAV-BS starts on it temporary-cell flight path and/or upon receiving the trigger, the method may include, at 580, scanning for the temporary cell established by the UAV-BS. According to one embodiment, the method may then include, at 590, initiating cell reselection and selecting the temporary cell. In an embodiment, the initiating of the cell reselection 590 may include initiating cell reselection by forcing one of the required conditions—e.g., by broadcasting a new threshold $S_{IntraSearchP}$ applicable only to UAV-service-capable devices such that the criterion Srxlev>$S_{IntraSearchP}$ would not be fulfilled and the devices would be forced to initiate cell reselection. In an embodiment, the initiating of the cell reselection 590 may include initiating cell reselection to the temporary cell set up by the UAV-BS, even when the normal signal-quality metrics for the terrestrial cell are satisfied. According to certain embodiments, the method may include performing UL/DL communications via the temporary cell of the UAV-BS.

In an embodiment, for reporting, the method may include receiving a network command and transmitting a response with the corresponding report. In another embodiment, the device may be preconfigured to perform Mobile Autonomous Reporting (MAR) at the time the UAV-BS forms its temporary cell. For software updates, the method may include receiving a network command to initiate the update followed by a multi-cast transmission in the entire cell (e.g., SC-PTM).

Figure 6A:
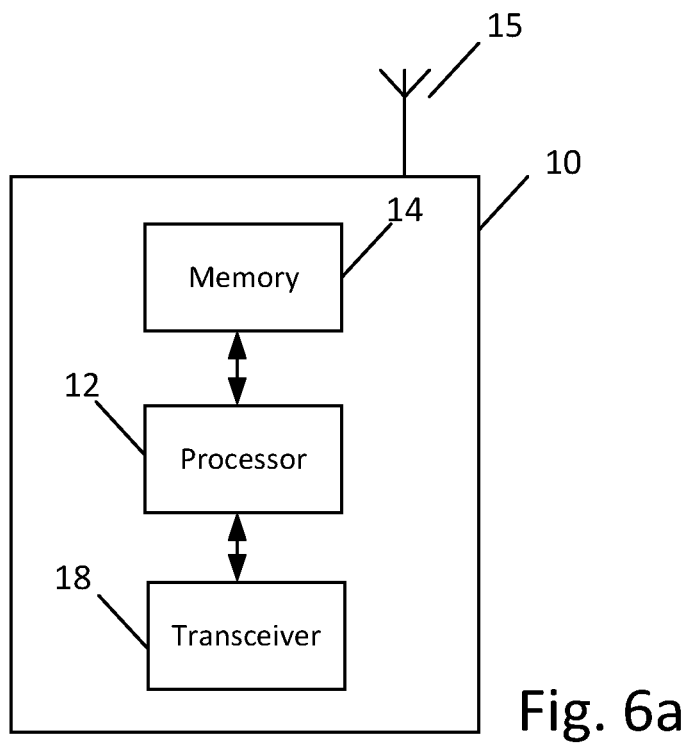
FIG. 6a illustrates an example block diagram of an apparatus, according to one embodiment.

FIG. 6a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), WLAN access point, associated with a radio access network, such as a LTE network, 5G or NR. In one embodiment, apparatus 10 may be a moving base station, UAV-BS, AGV-BS, and/or a terrestrial BS, eNB or gNB.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6a.

As illustrated in the example of FIG. 6a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow or signaling diagrams illustrated in FIG. 5a or 5b. In some embodiments, apparatus 10 may be configured to perform a procedure for deploying a moving BS or UAV-BS. As such, in one embodiment, apparatus 10 may be a moving BS, UAV-BS, AGV-BS, and/or terrestrial BS.

For instance, in one embodiment, apparatus 10 may be controlled by memory 14 and processor 12 to receive, from one or more devices, an indication that the devices are capable to quickly switch to a temporary cell of a unmanned vehicle BS or moving BS, such as an UAV-BS or AGV-BS. In some examples, in an embodiment, the devices may be in idle-mode DRX or eDRX, or configured with the PSM, and may normally be synchronized to a terrestrial eNB/gNB. Additionally, in one example, the devices may be in coverage enhancement and have network connectivity to the terrestrial eNB/gNB. In one embodiment, apparatus 10 may be controlled by memory 14 and processor 12 to move or fly along a predetermined or planned path and establish temporary cells at certain locations along the path.

According to an embodiment, apparatus 10 may be controlled by memory 14 and processor 12 to determine, based on knowledge of the locations along the UAV-BS's planned flight path, which of the UAV-service-capable devices are located along the planned flight path. According to certain embodiments, apparatus 10 may be controlled by memory 14 and processor 12 to create a database of multiple UAV-BS locations within a remote area (relative to the terrestrial eNB/gNB) along the planned path and the corresponding UAV-service-capable devices served by the cell at each of those locations.

In some embodiments, apparatus 10 may be controlled by memory 14 and processor 12 to determine locations for establishing each UAV-cell based on a desired UAV-BS service area and the coverage footprint of the UAV-cell at each location. In an embodiment, apparatus 10 may be controlled by memory 14 and processor 12 to create the database to include a mapping of UAV-service-capable devices to UAV-BS locations based on the coverage footprint for each UAV-BS location and the geographic location of devices. Alternatively, in an embodiment, the mapping may also be based on, or assisted by, measurement reports corresponding to each UAV-BS location. When new devices are deployed in the field and signal their UAV-service capability to apparatus 10, apparatus 10 may be controlled by memory 14 and processor 12 to register the new devices and use the above methods to map them to UAV-BS locations. In some embodiments, the planned flight path and the UAV-BS locations may be determined based on the coverage footprint of the terrestrial eNB/gNB, the ground coverage area of the UAV-BS, and/or the locations of the UAV-service-capable devices in the remote area.

In certain embodiments, apparatus 10 may be controlled by memory 14 and processor 12 to configure DRX or eDRX cycles or PSM of the devices so that the devices are awake when the UAV-BS establishes the temporary cell. In some embodiments, apparatus 10 may be controlled by memory 14 and processor 12 to configure the eDRX cycles or PSM of the UAV-service-capable devices via dedicated RRC or system information signaling, such that devices in each temporary cell are awake when the UAV-BS establishes a temporary cell.

According to certain embodiments, apparatus 10 may be controlled by memory 14 and processor 12 to configure, some time before the UAV-BS starts on its temporary-cell flight path, all UAV-service capable devices to switch to short DRX cycles. In an embodiment, apparatus 10 may be controlled by memory 14 and processor 12 to, after completion of the data connection with the temporary cell, reconfigure the devices with their previous eDRX cycles (i.e., their eDRX cycle prior to switching to short DRX). In some embodiments, when it is desirable to use really long DRX cycle (e.g., up to tens of minutes), apparatus 10 may be controlled by memory 14 and processor 12 to signal (e.g., via connection to another BS) when the UAV-BS is approaching the area so that a ground BS can reconfigure the DRX cycles of the devices to occur shortly after the expected arrival of the UAV-BS—or alternatively go to a shorter DRX cycle temporarily.

When UAV-service capable devices request a PSM configuration through a TAU request message, apparatus 10 may be controlled by memory 14 and processor 12 to configure, through the TAU accept message, the T3412 timer (Extended Value Timer) of all devices within a UAV-cell area to expire in a synchronized manner. The T3412 timer may determine the TAU period and hence how long the devices remains dormant before becoming active again for the next TAU. In an embodiment, apparatus 10 may be controlled by memory 14 and processor 12 to subsequently configure the T3324 timer (Active Timer) and the T3412 timer of the devices such that the devices become active at the next expected UAV-BS arrival time and stay active long enough for the completion of all UL and DL messaging. According to some embodiments, for frequent (or short periodicity) connection to UAV-BS, apparatus 10 may be controlled by memory 14 and processor 12 to re-configure the eDRX cycles or PSM of the devices using broadcast/multicast or dedicated RRC signaling. In an embodiment, the same timers T3412 and T3324 may be adjusted as in the case of reconfiguration received from the terrestrial eNB/gNB.

In certain embodiments, apparatus 10 may be controlled by memory 14 and processor 12 to configure the eDRX cycles of all devices within a UAV-BS-cell coverage area to be synchronized (e.g., same eDRX-Config-CycleStartOffset, etc.) or slightly staggered. According to one example, apparatus 10 may be controlled by memory 14 and processor 12 to configure one or more of the devices for long eDRX cycles (e.g., tens of minutes) to save power. According to some embodiments, apparatus 10 may be controlled by memory 14 and processor 12 to configure the eDRX cycles of devices in adjacent UAV-BS-cell coverage areas along the planned flight path of the UAV-BS to be staggered.

According to example embodiments, apparatus 10 may be controlled by memory 14 and processor 12 to establishing temporary cells at the locations in the previously created database, and to support UL/DL communications with the devices in each cell. In an embodiment, apparatus 10 may be controlled by memory 14 and processor 12 to maintain a backhaul connection with a ground station over a dedicated link.

In some embodiments, apparatus 10 may be controlled by memory 14 and processor 12 to trigger the UAV-service-capable devices to scan for and reselect the UAV-cell when the UAV-BS arrives at the different cell locations. For example, some time before the UAV-BS starts on it temporary-cell flight path, apparatus 10 may be controlled by memory 14 and processor 12 to trigger the devices (through a short message in system information) to scan for the temporary cell established by the UAV-BS. In an embodiment, apparatus 10 may be controlled by memory 14 and processor 12 to initiate cell reselection by forcing one of the required conditions—e.g., by broadcasting a new threshold $S_{IntraSearchP}$ applicable only to UAV-service-capable devices such that the criterion $Srxlev > S_{IntraSearchP}$ would not be fulfilled and the devices would be forced to initiate cell reselection. In one example, apparatus 10 may be controlled by memory 14 and processor 12 to transmit a discovery signal or normal synchronization and broadcast signals when the UAV-BS sets up the temporary cell. The devices may then perform cell reselection and select the temporary UAV-cell. In an embodiment, apparatus 10 may be controlled by memory 14 and processor 12 to trigger the devices to initiate cell reselection to the temporary cell set up by the UAV-BS, even when the normal signal-quality metrics for the terrestrial cell are satisfied.

According to an embodiment, for reporting, apparatus 10 may be controlled by memory 14 and processor 12 to issue a network command to each device and receive a response from the devices with the corresponding report. In another embodiment, apparatus 10 may be controlled by memory 14 and processor 12 to preconfigure the devices to perform Mobile Autonomous Reporting (MAR) at the time the UAV-BS forms its temporary cell. For software updates, apparatus 10 may be controlled by memory 14 and processor 12 to transmit a network command to initiate the update followed by a multi-cast transmission in the entire cell (e.g., SC-PTM). In some embodiments, the report or software update time may be optimized by performing them at a time of the day when the offloading of the devices to the temporary cell is most beneficial to the remote BS. In certain embodiments, apparatus 10 may be controlled by memory 14 and processor 12 to repeat the configuring and triggering steps at each predetermined location on the planned path of the UAV-BS.

Figure 6B:
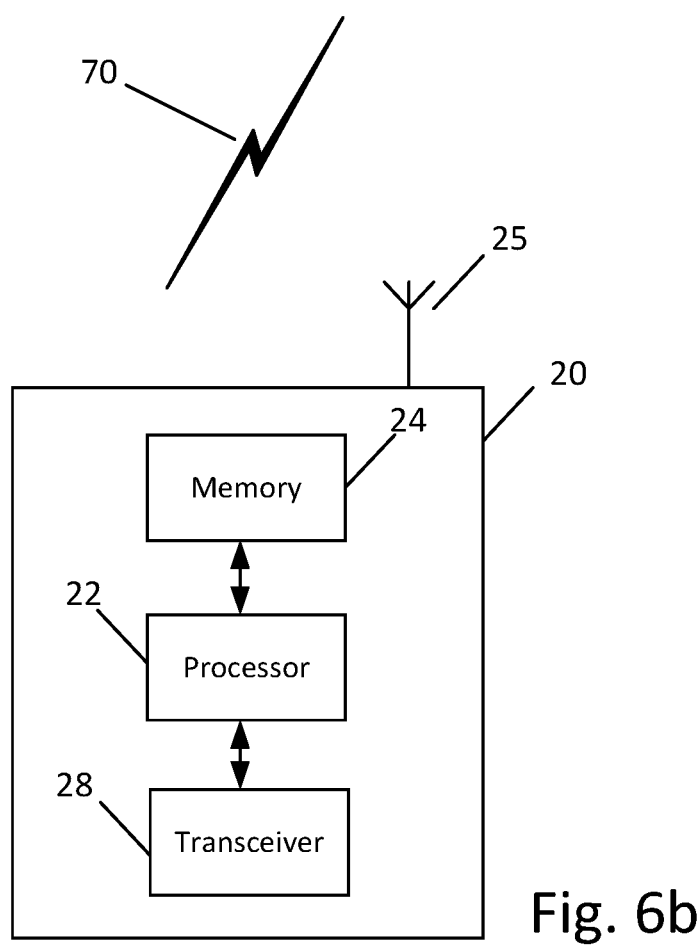
FIG. 6b illustrates an example block diagram of an apparatus, according to another embodiment.

FIG. 6b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6b.

As illustrated in the example of FIG. 6b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as the flow diagrams illustrated in FIG. 2b or 3b. For example, in certain embodiments, apparatus 20 may be configured to perform a procedure for mobility management in a NR based NTN.

According to some embodiments, apparatus 20 may be controlled by memory 24 and processor 22 to signal, to the network, an indication that apparatus 20 is a UAV-service-capable device that is capable of quickly switching to a temporary cell of a UAV-BS that is configured to move or fly along a predetermined or planned path and establish temporary cells at certain locations along the path. In certain embodiments, apparatus 20 may be controlled by memory 24 and processor 22 to receive a configuration of DRX or eDRX cycles or PSM so that the apparatus 20 is awake when the UAV-BS establishes the temporary cell at the location of apparatus 20. In some embodiments, apparatus 20 may be controlled by memory 24 and processor 22 to receive the configuration of the eDRX cycles or PSM via dedicated RRC or system information signaling from a terrestrial eNB/gNB and/or the UAV-BS.

According to certain embodiments, apparatus 20 may be controlled by memory 24 and processor 22 to receive a configuration, at some time before the UAV-BS starts on its temporary-cell flight path, to switch to short DRX cycles. In an embodiment, apparatus 20 may be controlled by memory 24 and processor 22 to, after completion of the data connection with the temporary cell, receive a reconfiguration to return to a previous eDRX cycles (i.e., the eDRX cycle prior to switching to short DRX).

When the device requests a PSM configuration through a TAU request message, apparatus 20 may be controlled by memory 24 and processor 22 to receive a configuration, through the TAU accept message, for the T3412 timer (Extended Value Timer) to expire in a synchronized manner with other devices in the temporary cell of the UAV-BS. The T3412 timer may determine the TAU period and hence how long apparatus 20 remains dormant before becoming active again for the next TAU. In one embodiment, apparatus 20 may be controlled by memory 24 and processor 22 to subsequently receive a configuration of the T3324 timer (Active Timer) and the T3412 timer such that apparatus 20 becomes active at the next expected UAV-BS arrival time and stays active long enough for the completion of all UL and DL messaging.

According to some embodiments, for frequent (or short periodicity) connection to UAV-BS, the eDRX cycles or PSM of apparatus 20 may be reconfigured by the UAV-BS using broadcast/multicast or dedicated RRC signaling. In an embodiment, the same timers T3412 and T3324 may be adjusted as in the case of reconfiguration received from the terrestrial eNB/gNB. In one embodiment, apparatus 20 may be controlled by memory 24 and processor 22 to receive the configuration commands for these timers without the need for sending TAU request and receive TAU accept messages to the UAV-BS. Rather, according to an embodiment, broadcast/multicast or dedicated RRC signaling from the UAV-BS may be used.

In certain embodiments, apparatus 20 may be controlled by memory 24 and processor 22 to receive a configuration such that the eDRX cycle of apparatus 20 is synchronized with other devices within a UAV-BS-cell coverage or is slightly staggered. According to one example, apparatus 20 may be controlled by memory 24 and processor 22 to receive a configuration for long eDRX cycles (e.g., tens of minutes) to save power. According to some embodiments, apparatus 20 may be controlled by memory 24 and processor 22 to receive a configuration such that the eDRX cycle of apparatus 20 is staggered with respect to the devices in adjacent UAV-BS-cell coverage areas along the planned flight path of the UAV-BS.

In some embodiments, apparatus 20 may be controlled by memory 24 and processor 22 to receive a trigger to scan for and reselect the temporary cell of the UAV-BS when (or slightly before) the UAV-BS arrives at its location. In one example, apparatus 20 may be controlled by memory 24 and processor 22 to receive a discovery signal or normal synchronization and broadcast signals when the UAV-BS sets up the temporary cell. In an embodiment, some time before the UAV-BS starts on it temporary-cell flight path and/or upon receiving the trigger, apparatus 20 may be controlled by memory 24 and processor 22 to scan for the temporary cell established by the UAV-BS. According to one embodiment, apparatus 20 may be controlled by memory 24 and processor 22 to initiate cell reselection and select the temporary cell. In an embodiment, apparatus 20 may be controlled by memory 24 and processor 22 to initiate cell reselection by forcing one of the required conditions—e.g., by broadcasting a new threshold $S_{IntraSearchP}$ applicable only to UAV-service-capable devices such that the criterion Srxlev>$S_{IntraSearchP}$ would not be fulfilled and the devices would be forced to initiate cell reselection. In an embodiment, apparatus 20 may be controlled by memory 24 and processor 22 to initiate cell reselection to the temporary cell set up by the UAV-BS, even when the normal signal-quality metrics for the terrestrial cell are satisfied. According to certain embodiments, apparatus 20 may be controlled by memory 24 and processor 22 to perform UL/DL communications via the temporary cell of the UAV-BS.

In an embodiment, for reporting, apparatus 20 may be controlled by memory 24 and processor 22 to receive a network command and transmit a response with the corresponding report. In another embodiment, apparatus 20 may be preconfigured to perform Mobile Autonomous Reporting (MAR) at the time the UAV-BS forms the temporary cell. For software updates, apparatus 20 may be controlled by memory 24 and processor 22 to receive a network command to initiate the update followed by a multi-cast transmission in the entire cell (e.g., SC-PTM).

Therefore, certain example embodiments provide several technical improvements, enhancements, and/or advantages. For example, certain embodiments provide methods for deploying a moving base station, such as UAV-BS(s) or AGV-BS(s), for IoT applications.

According to example embodiments, an unmanned vehicle BS or moving BS, such as an UAV-BS, may set up temporary cells that provide much better coverage and data rates to the devices than the remote terrestrial base station. The poorly connected devices may be effectively offloaded to the temporary cells, freeing up resources in the remote BS. The devices have much better uplink and downlink data rates with the UAV-BS cell, which enables them to complete their transmission/reception quickly, which saves device power consumption. Furthermore, the same UAV-BS can be reused for different cells and contributes to optimizing infrastructure expenditure. Certain embodiments enable configuration of devices to have synchronized or coordinated sleep cycles (either with eDRX or PSM) so the UAV-BS can communicate and exchange messages/data with IoT devices at each temporary cell location.

As such, example embodiments may improve power efficiency, performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

We claim:

1. An apparatus, comprising:
   at least one processor; and
   at least one memory comprising computer program code,
   the at least one memory and computer program code configured, with the at least one processor, to cause the apparatus at least to
   receive an indication from at least one device of its capability to switch to a temporary cell of an unmanned vehicle base station;
   determine, based on knowledge of locations on a planned path of the unmanned vehicle base station, which of the at least one device is located within coverage of one of the locations on the planned path; and
   configure discontinuous reception cycles or power saving mode of the at least one device so that the at least one device is awake when the unmanned vehicle base station establishes the temporary cell, wherein the discontinuous reception cycles or power saving mode of the at least one device are configured based on the planned path of the unmanned vehicle base station.

2. The apparatus according to claim 1, wherein the at least one memory and the computer program code are further configured, with the at least one processor, to cause the apparatus at least to:
   create a database comprising information on the locations along the path of the unmanned vehicle base station and corresponding information on which of the at least one device are located within coverage of one of said locations along the planned path of the unmanned vehicle base station.

3. The apparatus according to claim 1, wherein the at least one memory and the computer program code are further configured, with the at least one processor, to cause the apparatus at least to:
   trigger or block through signaling from a terrestrial base station the at least one device to scan for and select the temporary cell when the unmanned vehicle base station arrives at said one of the locations.

4. The apparatus according to claim 1, wherein the at least one memory and the computer program code are further configured, with the at least one processor, to cause the apparatus at least to:
   determine the locations for establishing each temporary cell based on at least one of a desired unmanned vehicle base station service area and a coverage footprint of the temporary cell at each of the locations.

5. The apparatus according to claim 1, wherein the at least one memory and the computer program code are further configured, with the at least one processor, to cause the apparatus at least to:
   map the at least one device to said locations based on a coverage footprint of the temporary cell at each of the locations and a geographic location of the at least one device.

6. The apparatus according to claim 1, wherein the at least one memory and the computer program code are further configured, with the at least one processor, to cause the apparatus at least to:
   configure the discontinuous reception cycles or the power saving mode of the at least one device via dedicated radio resource control or system information signaling from a terrestrial base station.

7. The apparatus according to claim 1, wherein the at least one memory and the computer program code are further configured, with the at least one processor, to cause the apparatus at least to:
   configure the discontinuous reception cycles of devices within a same coverage area of the temporary cell of the unmanned vehicle base station to be synchronized or staggered in time.

8. The apparatus according to claim 1, wherein the at least one memory and the computer program code are further configured, with the at least one processor, to cause the apparatus at least to:
   configure the discontinuous reception cycles of devices located in adjacent unmanned vehicle base station cell coverage areas to be staggered in time.

9. The apparatus according to claim 1, wherein the at least one memory and the computer program code are further configured, with the at least one processor, to cause the apparatus at least to:
   configure, before the unmanned vehicle base station starts on the planned path, the at least one device to switch to a short discontinuous reception cycle.

10. A method, comprising:
    receiving an indication from at least one device of its capability to switch to a temporary cell of an unmanned vehicle base station;
    determining, based on knowledge of locations on a planned path of the unmanned vehicle base station, which of the at least one device is located within coverage of one of the locations on the planned path; and
    configuring discontinuous reception cycles or power saving mode of the at least one device so that the at least one device is awake when the unmanned vehicle base station establishes the temporary cell, wherein the discontinuous reception cycles or power saving mode of the at least one device are configured based on the planned path of the unmanned vehicle base station.

11. The method according to claim 10, wherein the determining further comprises creating a database comprising information on the locations along the path of the unmanned vehicle base station and corresponding information on which of the at least one device are located within coverage of one of said locations along the planned path of the unmanned vehicle base station.

12. The method according to claim 10, further comprising:
    triggering or blocking through signaling from a terrestrial base station the at least one device to scan for and select the temporary cell when the unmanned vehicle base station arrives at said one of the locations.

13. The method according to claim 10, further comprising:
    determine the locations for establishing each temporary cell based on at least one of a desired unmanned vehicle base station service area and a coverage footprint of the temporary cell at each of the locations.

14. The method according to claim 10, wherein the determining further comprises mapping the at least one device to said locations based on a coverage footprint of the temporary cell at each of the locations and a geographic location of the at least one device.

15. The method according to claim 10, wherein the configuring further comprises configuring the discontinuous reception cycles or the power saving mode of the at least one device via dedicated radio resource control or system information signaling from a terrestrial base station.

16. The method according to claim 10, wherein the configuring further comprises configuring the discontinuous reception cycles of devices within a same coverage area of the temporary cell of the unmanned vehicle base station to be synchronized or staggered in time.

17. The method according to claim 10, wherein the configuring further comprises configuring the discontinuous reception cycles of devices located in adjacent unmanned vehicle base station cell coverage areas to be staggered in time.

18. The method according to claim 10, wherein the configuring further comprises configuring, before the unmanned vehicle base station starts on the planned path, the at least one device to switch to a short discontinuous reception cycle.

19. An apparatus, comprising:
   at least one processor; and
   at least one memory comprising computer program code,
   the at least one memory and computer program code configured, with the at least one processor, to cause the apparatus at least to
      signal, to a network, an indication that the apparatus is capable of switching to a temporary cell of an unmanned vehicle base station;
      receive a configuration of discontinuous reception cycles or power saving mode, wherein the received configuration causes the apparatus to wake up for cell reselection when the unmanned vehicle base station establishes the temporary cell, wherein the received configuration is based on a planned path of the unmanned vehicle base station;
      receive a trigger to scan for and reselect, while in idle mode, the temporary cell of the unmanned vehicle base station when the unmanned vehicle base station arrives at the location of the apparatus; and
      initiate cell reselection and select the temporary cell.

20. A non-transitory computer readable medium comprising program instructions stored thereon for performing the method according to claim 10.

* * * * *